Patented Mar. 26, 1946

2,397,201

UNITED STATES PATENT OFFICE 2,397,201

ACCELERATION OF THE POLYMERIZATION OF BUTADIENE-1,3 HYDROCARBONS

Emert S. Pfau, Akron, Ohio, assignor to The B. F. Goodrich Company, New York, N. Y., a corporation of New York No Drawing. Application April 16, 1945, Serial No. 588,729

6 Claims. (Cl. 260—93)

This invention relates to the polymerization of butadiene-1,3 hydrocarbons in aqueous emulsion and is particularly concerned with the carrying out of such polymerization in the presence of certain accelerating substances which have been treated prior to polymerization to increase their effectiveness.

In polymerizing butadiene-1,3 hydrocarbons, or mixtures thereof with copolymerizable compounds such as styrene, in aqueous emulsion to form synthetic rubber, it is generally desirable to include in the emulsion one or more substances (variously designated as polymerization catalysts, initiators, accelerators and activators, and hereinafter referred to as accelerating substances) whose primary function is to enable the polymerization to be effected in a shorter time than would otherwise be possible. Perhaps the best-known and most widely used of such substances are oxygen-yielding, water-soluble compounds such as the water-soluble persulfates. Another class of accelerating substances consists of water-soluble ferricyanides such as potassium ferricyanide.

However, when employing accelerating substances selected from either or both of these classes, it has still heretofore not been possible to effect the polymerization as rapidly as is sometimes desired. For example, when either potassium persulfate or potassium ferricyanide, or a mixture of both of these is added to an aqueous emulsion containing a monomeric mixture of butadiene-1,3 and styrene, an emulsifying agent such as a rosin soap, and a polymerization modifier (a substance whose primary function is to enable a more plastic polymerization product to be obtained) such as a mercaptan; and polymerization is then effected at 50° C., it generally requires from about 16 to 24 hours to convert from 60 to 80% of the monomeric material into synthetic rubber.

This invention provides a method whereby the rate of polymerization of butadiene-1,3 hydrocarbons in aqueous emulsion is greatly increased; in fact, to such an extent that, for example, the polymerization of a mixture of butadiene-1,3 and styrene under the conditions described above is carried to 70 to 80% conversion in only about 5 to 10 hours. In this method a combination of known polymerization accelerating substances, in particular, a mixture of a water-soluble persulfate and a water-soluble ferricyanide is employed, but instead of adding a mixture of such substances or a solution thereof to the emulsion without prior treatment, as in the conventional procedure, an aqueous solution containing such substances is first aged by heating the solution at 30 to 60° C. for a critical period of time, to be hereinafter defined, before its use in the emulsion polymerization. This expedient of first aging a solution containing both a persulfate and a ferricyanide under these conditions has been found not only greatly to increase the polymerization accelerating effect of such a solution, but also to result in other advantages in the emulsion polymerization process, as will be hereinafter described, and accordingly, this invention comprises the carrying out of the polymerization of butadiene-1,3 hydrocarbons in aqueous emulsion in the presence of such an aged solution.

In the practice of the invention a water-soluble persulfate such as potassium persulfate, sodium persulfate or ammonium persulfate and a water-soluble ferricyanide such as potassium ferricyanide, sodium ferricyanide, disodium potassium ferricyanide or dipotassium sodium ferricyanide, are dissolved in water, which may either be at normal temperature or heated to 30 to 60° C., to form a dilute aqueous solution; the solution is aged at a temperature of 30 to 60° C. for a critical length of time such that its polymerization accelerating ability is substantially increased; the aged solution is included in an aqueous emulsion containing a monomeric material comprising a butadiene-1,3 hydrocarbon; and the monomeric material is polymerized in the emulsion preferably by agitating the emulsion at a temperature of about 20 to 60° C. for a time sufficient for a predominant amount, preferably from 60 to 80%, of the monomeric material to be converted into polymer. The polymeric material, preferably a synthetic rubber, is thus obtained in the form of an aqueous dispersion or latex from which the massive polymer may be obtained, if desired, in the conventional manner.

The concentration of persulfate and ferricyanide in the original solution before aging is not critical and may be varied widely. However, it is preferred that dilute solutions containing a total salt content of about 1 to 20% by weight be used in the aging step, particularly if the solution after aging is to be cooled, in order to avoid any crystallization of persulfate or ferricyanide upon cooling of the solution. It is also preferred that the relative concentration of persulfate and ferricyanide be originally adjusted such that it is possible, in the final polymerization step, to add to the emulsion an aged solution containing from 0.01 to 1.0 part of persulfate and from 0.005 to 1.0 part of ferricyanide for each 100 parts of monomeric material to be polymerized, since fastest polymerization rates are secured when such concentrations are used.

Since the rate of polymerization of butadiene-1,3 hydrocarbons in aqueous emulsion in the presence of aged persulfate ferricyanide solutions is greatly affected by the temperature and time of aging, these factors are of critical importance in the process of this invention. As has been noted above, temperatures of about 30 to 60° C. are employed since the maintaining of a solution of persulfate and ferricyanide at such a temperature for a short period of time enables the polymerization to be effected at rates much faster than when unaged solutions are used. When aging at temperatures above about 60° C., on the other hand, no increase in polymerization rate over that obtained with an unaged solution is secured; rather the rate of polymerization is often decreased by such a treatment. Similarly temperatures below about 30° C. are not to be employed since aging at such temperatures fails to produce any significant difference in polymerization rates unless a time considerably longer than is normally required for polymerization is allowed for the aging step.

The time of aging the persulfate ferricyanide solution is dependent upon the temperature and is also critical. At temperatures of 50° to 60° C., a time interval of one to two hours or less has been found to produce an aged solution of optimum polymerization accelerating efficiency, although aging for a longer period of time, up to a maximum, still enables polymerization rates faster than with an unaged solution to be secured. At lower temperatures, 30° C., for example, the optimum time will be somewhat longer and is in the neighborhood of about 24 hours. In general the time of aging necessary for the obtainment of an aged solution having greater polymerization accelerating effect than an unaged solution, varies inversely with the cube of the temperature and is about ½ to 25 times that expressed by the relationship:

$$t = \frac{1}{T^3} \times 10^5$$

where $t$ is the time in hours and $T$ is the temperature in degrees centigrade, when the temperature is from 30° to 60° C. Polymerizations are generally fastest when the solution is aged for a time from 1 to 10 times that expressed by the above relationship, and hence it is preferred to age the solution only for such a time. In particular, aging at about 50° C. for about ½ to 2 hours is still more to be preferred. To further illustrate how the time of heating varies with the temperature, minimum, maximum and preferred times of heating for typical temperatures in the range of 30 to 60° C. are approximately as follows:

| Temp. | Minimum time (½ t) | Preferred time (1 to 10 t) | Maximum time (25 t) |
|---|---|---|---|
| | Hours | Hours | Hours |
| 30° C | 1.85 | 3.7 to 37 | 90 |
| 40° C | .75 | 1.5 to 15 | 39 |
| 50° C | .40 | 0.8 to 8 | 20 |
| 60° C | .20 | 0.4 to 4 | 11.5 |

After aging at the temperature and time indicated above, the persulfate ferricyanide solution is ready for use in the emulsion polymerization of butadiene-1,3 hydrocarbons and may be immediately added to an emulsion containing the material to be polymerized. Instead of adding the aged solution to the emulsion immediately after the aging process, however, it may be desirable to store the aged solution for a period of time prior to its use. If this is the case, it is preferable rapidly to cool the solution to a temperature below 30° C., preferably from 0° to 20° C. and to store the aged solution at this temperature since no substantial loss in its activity occurs under such conditions when stored for as long a period of time as is desired. Moreover, a solution aged at higher temperatures within the 30° to 60° C. range, for example, at 50° C. for one hour, may be cooled to lower temperatures within the said range, for example, to 30° C., and stored at the lower temperature for an additional period of time up to about ½ of the maximum aging time at the lower temperature without any substantial loss in activity.

It is believed that aging of the persulfate-ferricyanide solution under the conditions described above, brings about some chemical reaction between the persulfate and the ferricyanide. This is indicated by the fact that the solution changes in color during aging from yellow to a dark purplish brown, by the fact that blue colloidal particles are formed in the solution, and by the fact that a slight amount of hydrogen cyanide is evolved. The reaction, if any, however, is believed to involve only a small proportion of the total persulfate and ferricyanide present since the amount of colloidal material and hydrogen cyanide formed is quite small and since there is no unusual change in the pH or the oxidizing power of the solution during the treatment. It may be, therefore, that the remarkable accelerating effect of the aged solution is due at least in part to the formation of a small amount of a reaction product of persulfate with ferricyanide.

The evolution of hydrogen cyanide, although slight, may present a hazard, and can be eliminated by the addition of alkali to the solution. The addition of alkali with corresponding change in pH of the solution from less than 7 to more than 7 does not materially affect the accelerating activity of the aged solution.

The utilization of persulfate ferricyanide solutions which have been prepared and aged in the manner described above in the emulsion polymerization of butadiene-1,3 hydrocarbons, and the increase in polymerization rate effected thereby as compared to the use of unaged solutions or solutions aged in other ways, may further be illustrated by the following examples.

EXAMPLES 1 TO 4

Aqueous solutions each containing 0.30 part of potassium persulfate and 0.15 part of potassium ferricyanide are prepared and are aged by treatment in the manner shown in Table I. After aging, each of the solutions is added immediately to an aqueous emulsion containing 75 parts of butadiene-1,3, 25 parts of styrene, 180 parts of water, 5.0 parts of an emulsifying agent consisting of a dehydrogenated rosin soap (principally sodium dehydroabietate) and 0.5 part of polymerization modifier consisting 60% of dodecyl mercaptan and 40% of tertiary mercaptans principally tri-isobutyl mercaptan. The emulsions are then polymerized at 50° C. for the times shown in Table I, after which the yield of butadiene-1,3 styrene copolymer obtained is determined. The yield of polymer and the overall polymerization rate expressed in per cent yield per hr. for the various polymerizations are also shown in Table I. For purposes of comparison, data for control polymerizations in which the persulfate ferricyanide solution is unaged and in which the solution is aged under conditions without the scope of the invention are also presented.

*Table I*

|  | Aging treatment | Polymerization time | Yield | Overall polymerization rate per cent yield/hr. |
| --- | --- | --- | --- | --- |
|  |  | Hours | Per cent |  |
| Control 1 | None | 8 | 54 | 6.75 |
| Example 1 | 50° C. for 1 hr | 8 | 75 | 9.37 |
| Example 2 | 50° C. for 4 hrs | 8 | 70 | 8.75 |
| Example 3 | 50° C. for 12 hrs | 8 | 65 | 8.12 |
| Example 4 | 30° C. for 48 hrs | 8 | 70 | 8.75 |
| Control 2 | 40° C. for 48 hrs | 8 | 48 | 6.00 |
| Control 3 | 50° C. for 48 hrs | 8 | 32 | 4.00 |

These examples show, as is seen from the table, that aging of the accelerating solution greatly increases polymerization rate if a maximum time of aging for any given temperature is not exceeded (compare Examples 1, 2 and 3 and Control 3 with Control 1), and that the time of aging necessary for increasing polymerization rate varies inversely with the temperature (compare Example 4 with Controls 1, 2 and 3).

EXAMPLES 5 TO 16

Accelerating solutions containing about 7% by weight of a combination of potassium persulfate and disodium potassium ferricyanide and in which there is present 0.30 part of persulfate for each 0.075 part of ferricyanide are prepared and are then subjected to various aging treatments. An amount of each of the aged solutions containing 0.30 part of persulfate and 0.075 part of ferricyanide is then added to an aqueous emulsion containing 72 parts of butadiene-1,3, 28 parts of styrene, 180 parts of water, 5 parts of dehydrogenated rosin soap, 0.70 part of dodecyl mercaptan and sufficient alkali to impart a pH of about 10.0 to the emulsion, and each of the emulsions is agitated in a reactor at 50° C. for a time sufficient for 72% of the monomeric material to be polymerized. The various aging treatments and the polymerization time required for 72% conversion are shown in the following Table II.

*Table II*

|  | Aging treatment | Polymerization time |
| --- | --- | --- |
|  |  | Hours |
| Example 5 | 1 hr. at 40° C | 13.0 |
| Example 6 | 1 hr. at 45° C | 11.7 |
| Example 7 | 1 hr. at 50° C | 11.4 |
| Example 8 | 1 hr. at 55° C | 7.6 |
| Example 9 | 1 hr. at 60° C | 13.2 |
| Example 10 | 1 hr. at 50° C.; slow cooling for 8 hrs. (50-20° C.); then 12 hrs. at room temperature. | 9.8 |
| Example 11 | 1 hr. at 50° C.; rapid cooling to 20° C. then 12 hrs. at 20° C. | 9.2 |
| Example 12 | 1 hr. at 50° C.; rapid cooling to 30° C. then 16 hrs. at 30° C. | 11.2 |
| Example 13 | 1 hr. at 50° C.; then 16 hrs. in ice bath | 9.6 |
| Example 14 | 1 hr. at 55° C.; slow cooling for 8 hrs. then 12 hrs. at room temperature. | 14.0 |
| Example 15 | 1 hr. at 55° C.; rapid cooling to 20° C. then 12 hrs. at 20° C. | 13.1 |
| Example 16 | 1 hr. at 40° C.; slow cooling for 8 hrs. then 12 hrs. at room temperature. | 10.6 |
| Control | None | 16.0 |

These examples show that the polymerization rate is improved by all of the heat-treatments employed and that this improvement is retained when the solution is stored under a variety of conditions prior to its use. It is to be noted that 1 hr. at 55° C. gives fastest polymerization rate when the solution is immediately used but that 1 hr. at 50° C. is to be preferred when the solution is to be stored before use.

EXAMPLE 17

Example 7 is repeated except that sodium bicarbonate is added to the persulfate ferricyanide solution in an amount sufficient to change its normal pH of 3 to 4 to a pH of 7.6 before the solution is heated for 1 hr. at 50° C. On subsequent polymerization as in Example 7, 11.8 hrs. are required to produce a yield of 72%, thus showing that the pH of the solution may be adjusted to eliminate the danger of hydrogen cyanide liberation on heating, without substantially affecting its polymerization accelerating efficiency.

Although the above examples have been concerned with the polymerization in aqueous emulsion of a mixture of butadiene-1,3 and styrene in the presence of an aged persulfate-ferricyanide solution, it is to be understood that similar results are obtained when such a solution is employed to accelerate the emulsion polymerization of any of the butadiene-1,3 hydrocarbons such as, in addition to butadiene-1,3 itself, isoprene, 2,3-dimethyl butadiene-1,3, piperylene or the like, either alone or in admixture with each other or in admixture with other monomers copolymerizable therewith. Monomers copolymerizable with butadiene-1,3 hydrocarbons in aqueous emulsion are well known to the art and include, in addition to styrene, such other copolymerizable mono-olefinic compounds as alpha-methyl styrene, p-methyl styrene, 3,5-dichloro styrene, p-methoxy styrene, vinyl naphthalene, vinyl pyridine, vinyl furane, vinyl methyl ketone, vinyl methyl ether, vinyl acetate, vinylidene chloride, acrylonitrile, acrylamide, methyl acrylate, methyl methacrylate, alpha-chloro acrylonitrile, alpha-chloro methyl acrylate, isobutylene, ethylene and the like and such copolymerizable diolefinic compounds, in addition to those which are also butadiene-1,3 hydrocarbons, as 2-chloro-butadiene-1,3, 2-cyano butadiene-1,3, myrcene and the like. In polymerizing mixtures of one or more butadiene-1,3 hydrocarbons with one or more copolymerizable compounds it is preferred that the mixture contain at least 50% by weight of butadiene-1,3 hydrocarbon since polymeric materials which are rubbery in nature, and are known as synthetic rubber, are obtained in this case.

It is also to be understood that various emulsifying agents in addition to the dehydrogenated rosin soaps employed in the above examples, may also be utilized in preparing the aqueous emulsion of the butadiene-1,3 hydrocarbon. Examples of such other emulsifying agents include fatty acid soaps such as sodium oleate, sodium myristate, potassium palmitate and the like; alkali metal alkyl sulfates such as sodium lauryl sulfate; alkali metal aryl or alkaryl sulfonates such as sodium isobutyl naphthalene sulfonate and other anionic emulsifying agents as well as other types of emulsifying agents known to be useful in the emulsion polymerization of butadiene-1,3 hydrocarbons.

The following Example 18 illustrates the use of one of these other emulsifying agents:

EXAMPLE 18

An aqueous solution containing 0.30 part of potassium persulfate and 0.15 part of potassium ferricyanide is heated at 50° C. for 1 hour and is then added to an aqueous emulsion containing a mixture of 75 parts of butadiene-1,3 and 25 parts of styrene, 180 parts of water, 5 parts of the sodium soaps of saturated fatty acids and 0.42 part of commercial dodecyl mercaptan. Upon polymerization of the mixture in the emulsion at 50° C., a 75% yield of a butadiene-1,3 styrene synthetic rubber is obtained in 5 hrs. although a considerably longer time is required when the persulfate-ferricyanide solution is not aged prior to the polymerization.

In addition to the monomeric material to be polymerized, water and emulsifying agent, the aqueous emulsion to which the accelerating solution is added will also preferably contain a polymerization modifier since the presence of such a substance enables plastic polymerization products resembling unvulcanized natural rubber rather than tough, non-plastic polymers resembling vulcanized natural rubber to be obtained. It is preferable to employ, as a polymerization modifier, a mercaptan such as dodecyl mercaptan, triisobutyl mercaptan, octadecyl mercaptan, beta-(p-octyl phenoxy) beta'-mercapto diethyl ether, or the like or mixtures of these or of other primary, secondary or tertiary mercaptans containing from 8 to 24 carbon atoms, but other polymerization modifiers which are organic compounds possessing a divalent sulfur atom linked to carbon may also be used.

The plasticity of the polymerization product is ordinarily dependent only upon the amount of modifier employed but it has been found that the practice of this invention, using an accelerating solution consisting of an aged persulfate-ferricyanide mixture, enables a polymer of given plasticity to be produced with lesser amounts of modifier than has heretofore been required. A saving in modifier is thereby effected. This advantage is particularly important when polymerizing a mixture of butadiene-1,3 and styrene in presence of a dehydrogenated rosin soap and an aliphatic mercaptain since such systems ordinarily require a high concentration of modifier.

Examples 19 and 20 illustrate the fact that more plastic polymers are obtained when proceeding in accordance with this invention.

EXAMPLES 19 AND 20

In Example 19 an aqueous solution containing 0.45 part of potassium persulfate and 0.15 part of potassium ferricyanide is heated to 50° C. for 1 hour and is then added to an emulsion containing 75 parts of butadiene-1,3, 25 parts of styrene, 200 parts of soft water, 5 parts of dehydrogenated rosin soap, sufficient alkali to produce a pH of 10, and 0.70 part of dodecyl mercaptan, and polymerization is then effected at 50° C. After 11.6 hours a 74% yield of a butadiene-1,3 styrene synthetic rubber having a Mooney viscosity at 212° F. of 30 is obtained, but when the polymerization is repeated using the same quantities of materials but without aging the persulfate and ferricyanide, the polymerization requires 16.6 hours to produce a 74% yield and the synthetic rubber obtained is less plastic, possessing a Mooney viscosity at 212° F. of 42. In Example 20, the procedure of Example 19 is repeated except that only 0.46 part of mercaptan is employed, and a 74% yield of an excellent synthetic rubber having a Mooney viscosity at 212° F. of 50 is obtained, but when this polymerization is repeated without aging of the persulfate-ferricyanide, the rubber obtained at 74% conversion is less plastic and possesses a Mooney viscosity at 212° F. of 62. Thus, it is seen that a synthetic rubber of about the same plasticity is obtained in this invention when about 0.50 part of mercaptan is employed as is obtained with 0.70 part of mercaptan without aging of the accelerating solution.

Still other expedients well known to the art of emulsion polymerization of butadiene-1,3 hydrocarbons may be made use of when also proceeding in the manner hereinabove described. For example, the polymerization may be readily effected in a continuous manner because of the very rapid polymerization rates.

Numerous other variations and modifications in the preparation and aging of the accelerating solutions used in this invention and in the polymerization of butadiene-1,3 hydrocarbons in the presence of such solutions will occur to those skilled in the art and are within the spirit and scope of the appended claims.

I claim:

1. The method which comprises preparing an aqueous solution containing a water-soluble persulfate and a water-soluble ferricyanide, aging the said solution at a temperature of 30 to 60° C. for a time sufficient substantially to increase the ability of said solution to accelerate the polymerization of butadiene-1,3 hydrocarbons, and then polymerizing a butadiene-1,3 hydrocarbon in aqueous emulsion in the presence of the aged solution.

2. The method which comprises preparing an aqueous solution containing a water-soluble persulfate and a water-soluble ferricyanide, aging the said solution at a temperature of 30 to 60° C. for a period of time dependent upon the temperature, said time being from ½ to 25 times that expressed by the equation:

$$t = \frac{1}{T^3} \times 10^5$$

where $t$ is the time in hours and $T$ is the temperature in degrees centigrade, and polymerizing a butadiene-1,3 hydrocarbon in aqueous emulsion in presence of the aged solution.

3. The method which comprises preparing an aqueous solution containing a water-soluble persulfate and a water-soluble ferricyanide, heating the said solution at a temperature of 30 to 60° C. for a period of time dependent upon the temperature, said time being from 1 to 10 times that expressed by the equation:

$$t = \frac{1}{T^3} \times 10^5$$

where $t$ is the time in hours and $T$ is the temperature in degrees centigrade, adding the so-treated solution to an aqueous emulsion comprising a monomeric mixture of butadiene-1,3 and styrene, and polymerizing the said mixture in the emulsion in presence of the added solution.

4. The method which comprises preparing an aqueous solution containing a water-soluble persulfate and a water-soluble ferricyanide, heating the said solution at a temperature of 30 to 60° C. for a period of time dependent upon the temperature, said time being from 1 to 10 times that expressed by the equation:

$$t = \frac{1}{T^3} \times 10^5$$

where $t$ is the time in hours and $T$ is the temperature in degrees centigrade, adding the so-treated solution to an aqueous emulsion containing a monomeric mixture of butadiene-1,3 and styrene, a dehydrogenated rosin soap and an aliphatic mercaptan, and polymerizing the said mixture in the emulsion in the presence of the added solution.

5. The method which comprises preparing an aqueous emulsion containing a water-soluble persulfate and a water-soluble ferricyanide, aging the said solution at a temperature of about 50° C. for about ½ to 2 hours, adding the aged solution to an aqueous emulsion containing a monomeric mixture of butadiene-1,3 and styrene, and polymerizing the monomeric mixture in the emulsion in presence of the aged solution.

6. The method which comprises preparing an aqueous emulsion containing potassium persulfate and potassium ferricyanide, aging the said solution at a temperature of about 50° C. for about ½ to 2 hours, adding the aged solution to an aqueous emulsion containing a monomeric mixture of butadiene-1,3 and styrene, a soap and an aliphatic mercaptan, and polymerizing the monomeric mixture in the emulsion in presence of the aged solution for a time sufficient to convert from 60 to 80% of the monomeric mixture into polymer.

EMERT S. PFAU.